US007135954B1

(12) United States Patent
Huang

(10) Patent No.: US 7,135,954 B1
(45) Date of Patent: Nov. 14, 2006

(54) CIRCUIT BREAKER FOR ELECTRIC COUPLING DEVICE

(75) Inventor: Hsien Ming Huang, Yunlin Hsien (TW)

(73) Assignee: Kuoyuh W.L. Enterprise Co., Ltd., Yunlin Hsien (TW)

( * ) Notice: Subject to any disclaimer, the term of this patent is extended or adjusted under 35 U.S.C. 154(b) by 0 days.

(21) Appl. No.: 11/317,553

(22) Filed: Dec. 24, 2005

(51) Int. Cl.
*H01H 61/04* (2006.01)
*H02B 1/04* (2006.01)

(52) U.S. Cl. .......................... 337/85; 337/91; 337/112; 361/102; 361/673; 361/730

(58) Field of Classification Search .................. 337/14, 337/36, 37, 85, 89, 91, 111–113, 123, 126, 337/131; 361/102–106, 673, 728–730
See application file for complete search history.

(56) References Cited

U.S. PATENT DOCUMENTS 4,771,367 A 9/1988 Serr et al. .................. 361/730
4,959,025 A * 9/1990 Eberhard et al. ........ 439/620.3
5,590,010 A * 12/1996 Ceola et al. ............... 361/93.4
5,742,464 A * 4/1998 Ceola et al. ................ 361/103
5,772,473 A 6/1998 Cheng et al. .......... 439/620.34
5,930,097 A * 7/1999 Ceola et al. ................ 361/103
6,204,747 B1 * 3/2001 Kitchens ..................... 337/407
6,603,385 B1 * 8/2003 Kitchens ..................... 337/407
6,753,755 B1 * 6/2004 Montague ................... 337/265

* cited by examiner

*Primary Examiner*—Ramon M. Barrera
(74) *Attorney, Agent, or Firm*—Charles E. Baxley

(57) ABSTRACT

An electric coupling device includes a housing having a front socket opening and a rear chamber formed by two side wall. Two prongs are disposed in the socket opening of the housing and each has a free end extended out of the housing, and two conductor terminals are electrically coupled to the prongs, and a circuit breaker is coupled between one of the prongs and one of the conductor terminals and includes a conductor blade made of memorized material for selectively terminating or switching off the electric circuit between the conductor terminal and the prong when overheated or overloaded, and a reset knob may selectively and easily and readily switch on the electric circuit again.

11 Claims, 4 Drawing Sheets

CIRCUIT BREAKER FOR ELECTRIC COUPLING DEVICE

BACKGROUND OF THE INVENTION

1. Field of the Invention

The present invention relates to an electric coupling device, and more particularly to an electric coupling device including a circuit breaker having a memorized spring blade for switching off an electric circuit when overheated or when overloaded and having a reset member for resetting and for easily switching on the electric circuit.

2. Description of the Prior Art

Typical electric coupling devices, such as sockets, plugs, or the like are provided for coupling various electric facilities to electric power sources, and comprise one or more socket openings and one or more conductor terminals or prongs for electrically coupling to the electric facilities and the electric power sources.

For safety purposes, one or more fuses will be provided and coupled to or between the electric facilities and the electric power sources for automatically terminating or switching off the electric circuit when overheated or when overloaded.

For example, U.S. Pat. No. 5,772,473 to Cheng et al. discloses one of the fuse holders having a cartridge fuse for coupling between the electric facilities and the electric power sources and the cartridge fuse will be burned out when overheated or overloaded, for preventing the electric facilities from being damaged by such as overheating or overloading. However, once the cartridge fuse is burned out, another cartridge fuse is required to be provided and prepared and engaged into the fuse holder again, and it is time consuming and complicated to replace or to change the cartridge fuse.

U.S. Pat. No. 4,771,367 to Serr et al. discloses a typical electric plug having an integral circuit breaker or over0current protection means. The breaker is sold by Mechanical Products, Inc. of Jackson, Mich. As the 2000 series. However, the breaker is expensive.

The present invention has arisen to mitigate and/or obviate the afore-described disadvantages of the conventional electric coupling devices.

SUMMARY OF THE INVENTION

The primary objective of the present invention is to provide an electric coupling device including a circuit breaker having a memorized spring blade for switching off an electric circuit when overheated or when overloaded and having a reset member for resetting and for easily switching on the electric circuit.

In accordance with one aspect of the invention, there is provided an electric coupling device comprising a housing including a front socket opening of the housing, and including a rear wall for defining the socket opening of the housing, and including a chamber formed in a rear portion of the housing, and including two side walls for defining the chamber of the housing, and including an aperture formed in the front portion of the housing, a first prong and a second prong disposed in the socket opening of the housing, the first and the second prongs each including a free end extended out through the rear wall of the housing, the first and the second prongs being disposed side by side and parallel to each other for coupling to electric plugs, a first conductor terminal disposed outside the housing and electrically coupled to the free end of the first prong, a second conductor terminal disposed in the chamber of the housing, a conductor coupling member disposed outside the housing and electrically coupling to the free end of the second prong, and including a bent segment extended into the chamber of the housing, a circuit breaker including a conductor blade made of memorized material and having a first end electrically coupled to the second conductor terminal and having a second end located adjacent to the bent segment of the conductor coupling member for electrically contacting with or separated from the bent segment of the conductor coupling member to switch on an electric circuit between the second conductor terminal and the conductor coupling member, and for selectively terminating or switching off the electric circuit between the second conductor terminal and the conductor coupling member when overheated or overloaded, and a reset knob slidably engaged through the aperture of the housing and including an inner portion having an actuator for selectively switching on the electric circuit between the second conductor terminal and the conductor coupling member after the conductor blade of the circuit breaker has switched off the electric circuit between the second conductor terminal and the conductor coupling member.

The conductor coupling member includes a first electrical contact member disposed on the bent segment, and the conductor blade includes a second electrical contact member disposed on the second end of the conductor blade for selectively contacting with the first electrical contact member of the conductor coupling member. The conductor coupling member includes a first end having a hole for receiving the free end of the second prong.

A carrier is slidably engageable into the chamber of the housing for supporting the second conductor terminal and the conductor coupling member. The carrier includes a recess for receiving and seating the second conductor terminal. The carrier includes a recess for receiving and seating the bent segment of the conductor coupling member.

The housing includes an orifice formed in one of the side walls and communicating with the chamber of the housing, and the carrier includes at least one hole aligned with the orifice of the housing, and a lock pin engaged through the orifice of the housing and the hole of the carrier for securing the carrier to the housing.

The carrier includes a bulge, and a cap includes a depression for receiving the bulge of the carrier and for anchoring the cap between the carrier and the rear wall of the housing. The carrier includes at least one peg extended from the bulge for engaging with the cap and for securing the cap to the carrier. The housing includes at least one rail extended from the side walls and extended into the chamber of the housing for engaging with the carrier and for securing the carrier to the housing.

A ground prong is disposed in the socket opening of the housing and disposed above the first and the second prongs, and a ground terminal is disposed extended out of the housing and electrically coupled to the ground prong.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 2:
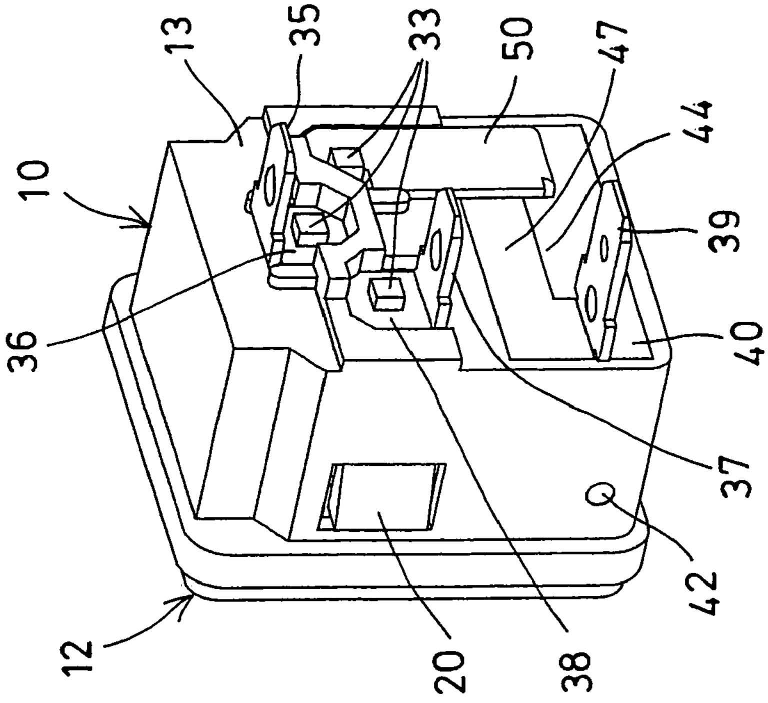
FIG. 2 is a rear perspective view of the electric coupling device.
Figure 1:
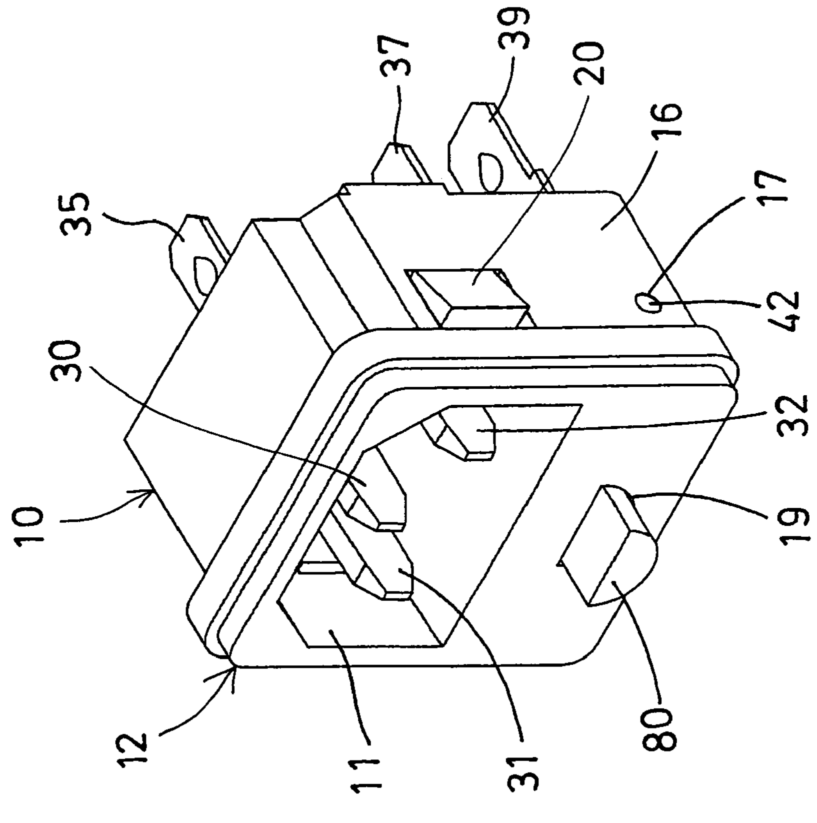
FIG. 1 is a front perspective view of an electric coupling device in accordance with the present invention.
Figure 3:
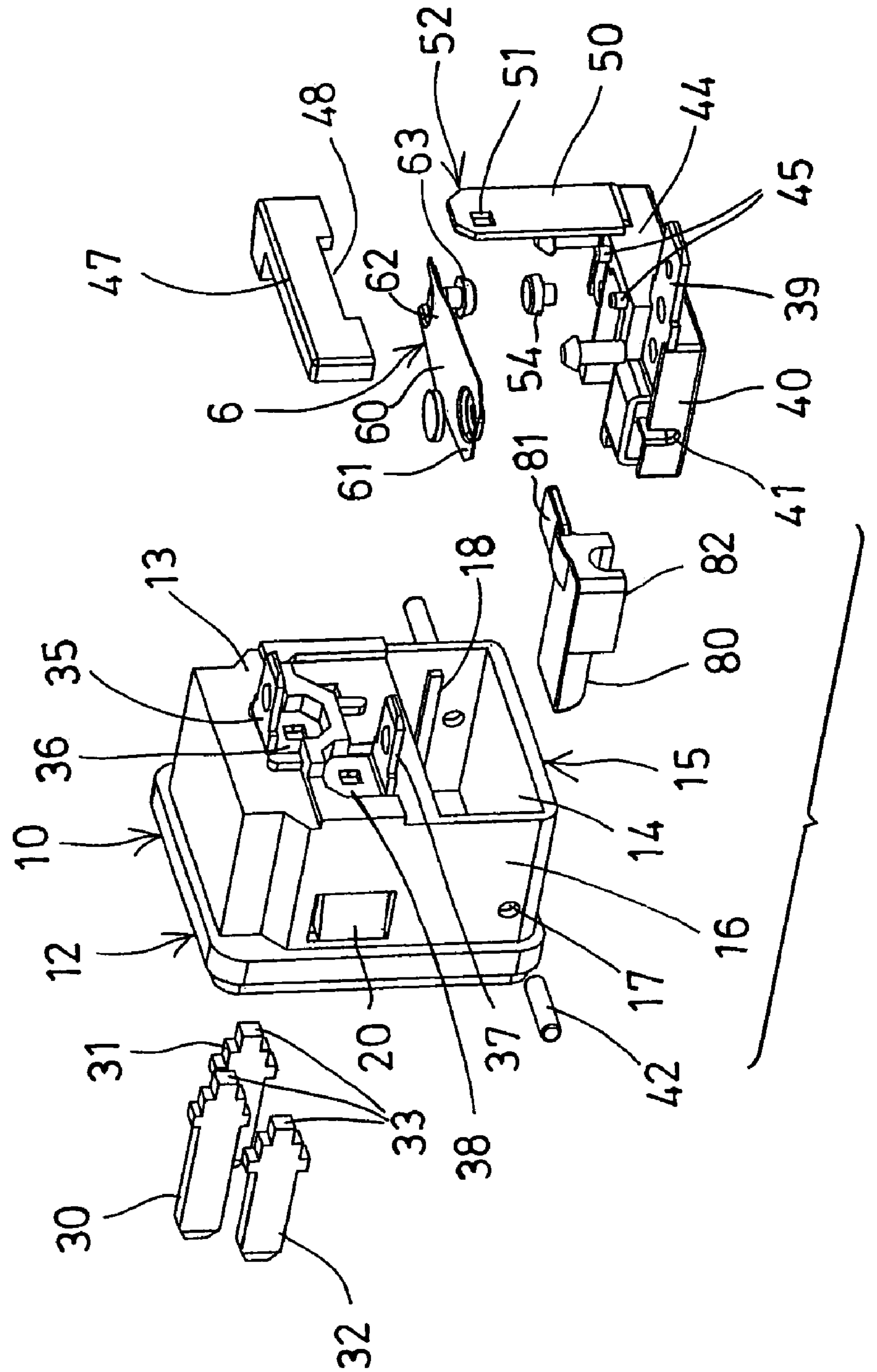
FIG. 3 is a partial exploded view as seen from the rear portion of the electric coupling device.

Referring to the drawings, and initially to FIGS. 1–3, an electric coupling device in accordance with the present invention comprises an outer housing 10 including a socket opening 11 formed in one side or front portion 12 thereof, and preferably located in the upper portion of the front portion 12 of the outer housing 10, and including a rear wall 13 for forming or defining the socket opening 11 of the outer housing 10, and including a chamber 14 formed in the rear portion 15 of the outer housing 10 (FIGS. 3, 4) and preferably located below the front socket opening 11 of the outer housing 10.

Figure 4:
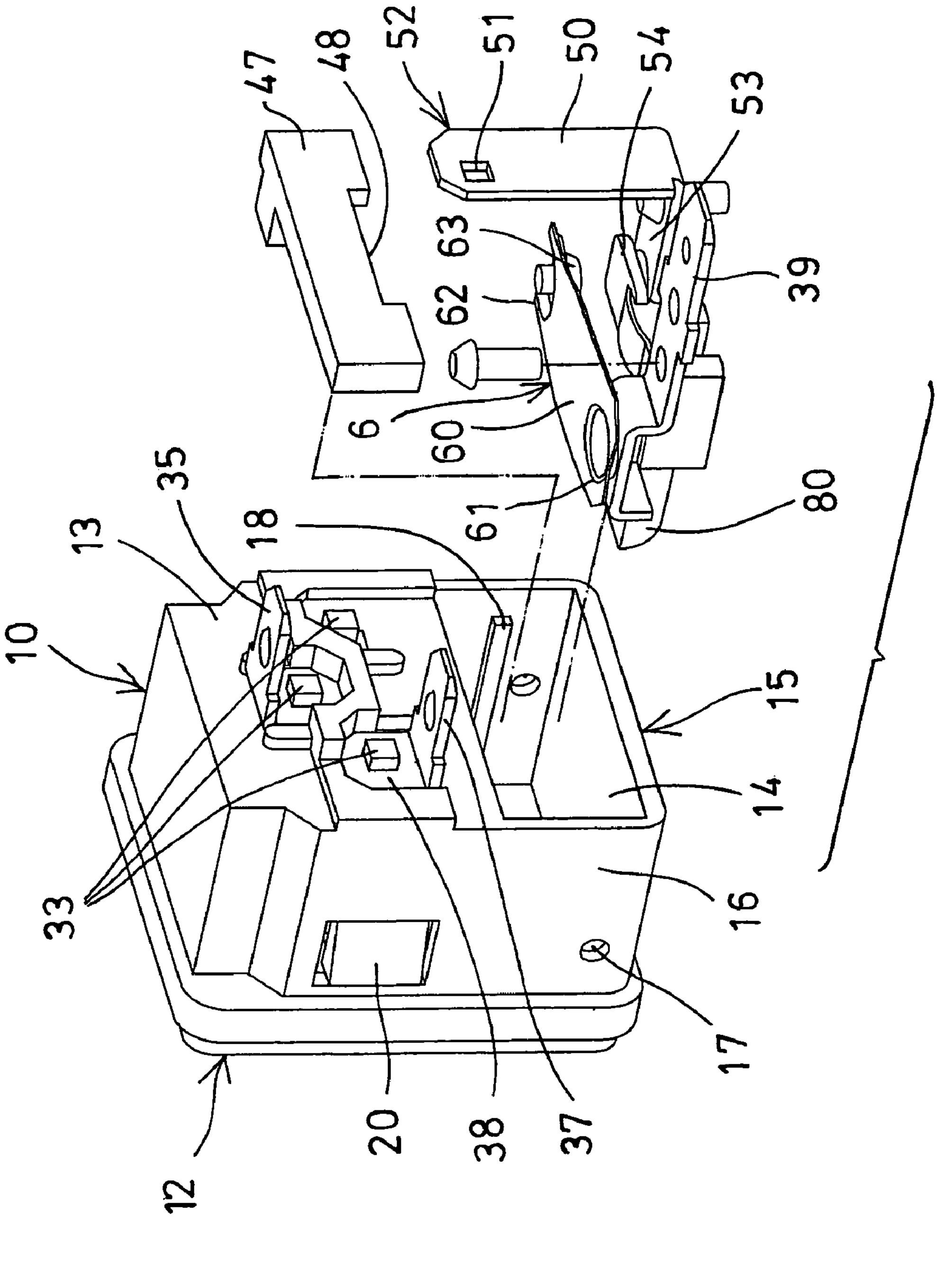
FIG. 4 is a partial exploded view similar to FIG. 3, as also seen from the rear portion of the electric coupling device.

The outer housing 10 may include two side walls 16 for forming or defining the chamber 14 of the outer housing 10, and may include an orifice 17 formed in each of the side walls 16 and communicating with the chamber 14 of the outer housing 10, and may include a rail 18 formed or extended from each of the side walls 16 and extended into the chamber 14 of the outer housing 10 (FIGS. 3, 4). The outer housing 10 further includes an aperture 19 formed in the front portion 12 of the outer housing 10 and located below the front socket opening 11 of the outer housing 10 and communicating with the chamber 14 of the outer housing 10. The outer housing 10 may include one or more, such as two side latches 20 extended therefrom for latching or locking or attaching to various objects or electric facilities (not shown).

The outer housing 10 further includes a ground prong 30 and two further prongs 31, 32 disposed or engaged in the front socket opening 11 of the outer housing 10, and the prongs 30–32 each includes a rear or outer or free end 33 engaged through the rear wall 13 of the outer housing 10 and partially extended out through the rear wall 13 of the outer housing 10, best shown in FIGS. 2 and 4. As shown in FIG. 1, the two prongs 31, 32 are disposed side by side and arranged parallel to each other, and the ground prong 30 is disposed slightly above the two prongs 31, 32, and the prongs 30–32 are arranged in the conventional way for plugging or coupling to various electric plugs (not shown).

A ground terminal 35 is disposed behind or extended out of the rear wall 13 of the outer housing 10 and disposed or arranged parallel to the ground prong 30, and includes a bent segment 36 perpendicular to the ground terminal 35 and engaged or secured to the rear wall 13 of the outer housing 10 and electrically coupled to the free end 33 of the ground prong 30. A conductor terminal 37 is also disposed behind or extended out of the rear wall 13 of the outer housing 10 and disposed or arranged parallel to one of the prongs 32, and also includes a bent segment 38 perpendicular to the conductor terminal 37 and engaged or secured to the rear wall 13 of the outer housing 10 and electrically coupled to the free end 33 of the prong 32. Another conductor terminal 39 is arranged to be electrically coupled to the other prong 31 via a circuit breaker 6 (FIGS. 3, 4) which will be discussed hereinafter.

A casing or carrier 40 is slidably engageable into the chamber 14 of the outer housing 10, and includes one or more, such as two holes 41 formed in the two side portions thereof for aligning with the orifices 17 of the side walls 16 of the outer housing 10, and for receiving lock pins 42 which may lock or secure the carrier 40 in the chamber 14 of the outer housing 10. The rails 18 may also be used to anchor and to position the carrier 40 in the outer housing 10. The carrier 40 includes a recess 43 formed in the upper portion of one side thereof for receiving or seating the other conductor terminal 39 (FIG. 3), and preferably includes a central bulge 44 extended upwardly from the middle portion thereof, and preferably includes one or more, such as two pegs 45 extended upwardly from the central bulge 44 of the carrier 40.

Figure 5:
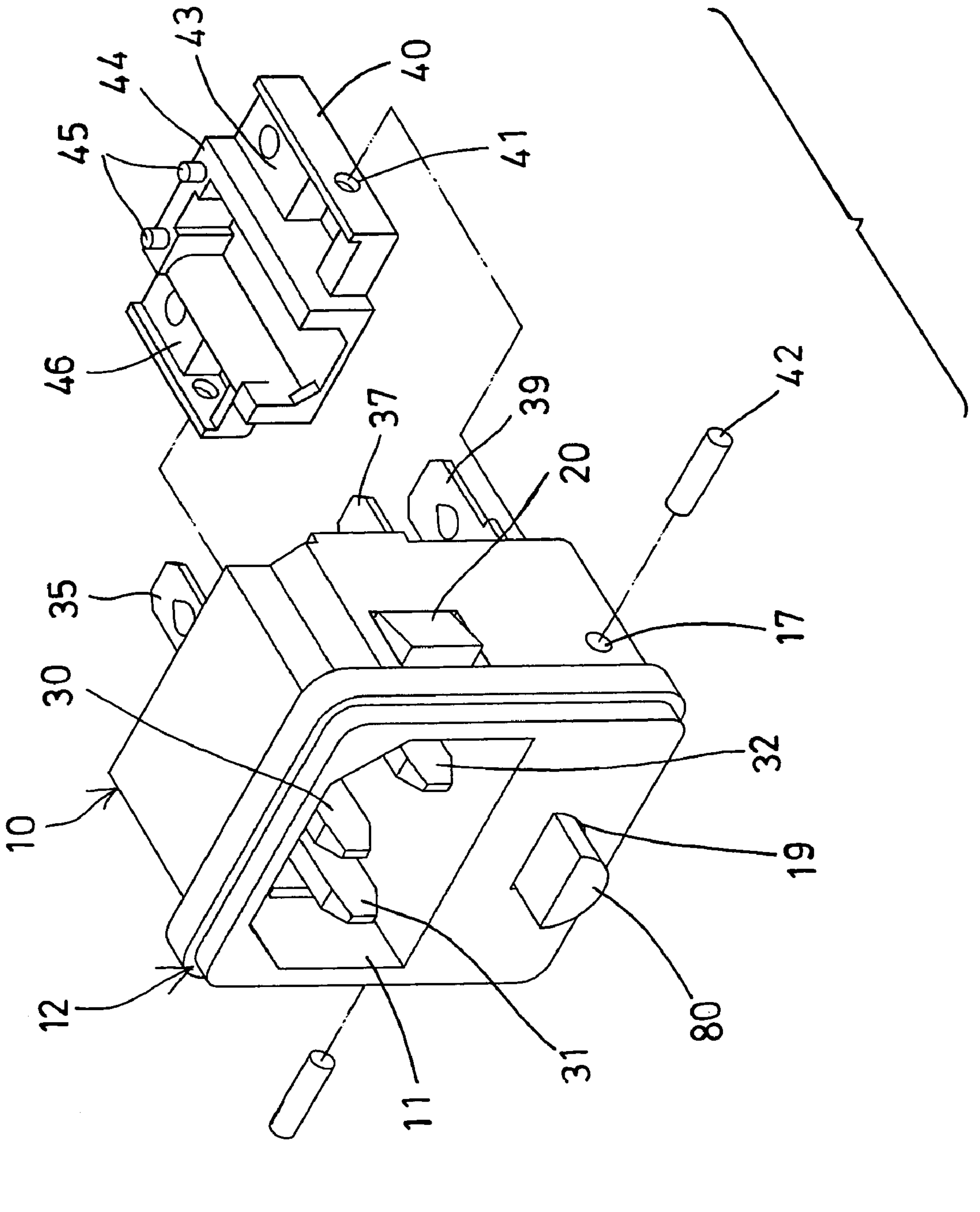
FIG. 5 is a partial exploded view as seen from the front portion of the electric coupling device.

A conductor coupling member 50 is disposed behind or outside the rear wall 13 of the outer housing 10 and includes a hole 51 formed in one end 52 thereof for receiving and electrically coupling to the free end 33 of the other prong 31, and includes a bent segment 53 perpendicular to the conductor coupling member 50 and extended into the chamber 14 of the outer housing 10 and engaged or received or secured in another recess 46 that is formed in the other side of the upper portion of the carrier 40 (FIG. 5). It is preferable that an electrical contact member 54 is disposed or secured on top of the bent segment 53 of the conductor coupling member 50 (FIG. 4).

The circuit breaker 6 includes a spring or conductor blade 60 having one end 61 electrically coupled or secured to the other conductor terminal 39 and having the other end 62 located above or adjacent to the electrical contact member 54 or the bent segment 53 of the conductor coupling member 50, best shown in FIG. 4. It is also preferable that another electrical contact member 63 is disposed or secured on the other end 62 of the conductor blade 60 and facing toward the electrical contact member 54 of the conductor coupling member 50 for electrically contacting or coupling to the conductor coupling member 50 and thus to the other prong 31. A cap 47 may include a depression 48 formed in the lower portion for receiving the central bulge 44 of the carrier 40 and may include one or more cavities formed therein (not shown) for receiving the pegs 45 of the carrier 40 and for anchoring or securing the cap 47 between the carrier 40 and the rear wall 13 of the outer housing 10 (FIG. 2).

The conductor blade 60 is made of piezo-electric materials, or typical memorized materials for allowing the electrical contact member 63 or the other end 62 of the conductor blade 60 to normally and electrically contact or couple to the electrical contact member 54 or the bent segment 53 of the conductor coupling member 50 and thus the other prong 31 in order to switch on the electric circuit between the other conductor terminal 39 and the conductor coupling member 50, and arranged for allowing the electrical contact member 63 or the other end 62 of the conductor blade 60 to be disengaged or separated or sprung away from the electrical contact member 54 or the bent segment 53 of the conductor coupling member 50, in order to break or to terminal or to switch off the electric circuit between the other conductor terminal 39 and the conductor coupling member 50, when overheated or when overloaded, and thus for preventing disasters from being happened or occurred.

The electric coupling device further includes a reset knob 80 slidably engaged outward through the aperture 19 of the outer housing 10 (FIGS. 1, 5), and includes a limb or actuator 81 extended from an inner portion 82 thereof that is slidably received in the chamber 14 of the outer housing 10. The actuator 81 of the reset knob 80 is arranged for engaging with or for actuating the conductor blade 60 and for forcing the electrical contact member 63 or the other end 62 of the conductor blade 60 to engage with the electrical contact member 54 or the bent segment 53 of the conductor coupling member 50 again after the electrical contact member 63 or the other end 62 of the conductor blade 60 has been disengaged or separated or sprung away from the electrical contact member 54 or the bent segment 53 of the conductor coupling member 50 due to overheating or overloading.

It is to be noted that, alternatively, the other conductor terminal 39 and the conductor coupling member 50 may also be arranged to be normally and electrically contacted or coupled together when the electrical contact member 63 or the other end 62 of the conductor blade 60 of the circuit breaker 6 is disengaged or separated or sprung away from the electrical contact member 54 or the bent segment 53 of the conductor coupling member 50, and the electrical contact member 63 or the other end 62 of the conductor blade 60 may be bent or sprung toward and to engage with the electrical contact member 54 or the bent segment 53 of the conductor coupling member 50, in order to break or to terminal or to switch off the electric circuit between the other conductor terminal 39 and the conductor coupling member 50, when overheated or when overloaded, and the actuator 81 of the reset knob 80 may be used to disengage or to separate the electrical contact member 63 or the other end 62 of the conductor blade 60 and the electrical contact member 54 or the bent segment 53 of the conductor coupling member 50 from each other in order to switch on the electric circuit again after the conductor blade 60 of the circuit breaker 6 has terminated or switched off the electric circuit between the other conductor terminal 39 and the conductor coupling member 50.

Accordingly, the electric coupling device includes a circuit breaker having a memorized spring blade for switching off an electric circuit when overheated or overloaded and having a reset member for resetting and for easily switching on the electric circuit.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric coupling device comprising:

a housing including a socket opening formed in a front portion of said housing, and including a rear wall for defining said socket opening of said housing, and including a chamber formed in a rear portion of said housing, and including two side walls for defining said chamber of said housing, and including an aperture formed in said front portion of said housing, a first prong and a second prong disposed in said socket opening of said housing, said first and said second prongs each including a free end extended out through said rear wall of said housing, said first and said second prongs being disposed side by side and parallel to each other for coupling to electric plugs, a first conductor terminal disposed outside said housing and electrically coupled to said free end of said first prong, a second conductor terminal disposed in said chamber of said housing, a conductor coupling member disposed outside said housing and electrically coupling to said free end of said second prong, and including a bent segment extended into said chamber of said housing, a circuit breaker including a conductor blade made of memorized material and having a first end electrically coupled to said second conductor terminal and having a second end located adjacent to said bent segment of said conductor coupling member for electrically contacting with or separated from said bent segment of said conductor coupling member to switch on an electric circuit between said second conductor terminal and said conductor coupling member, and for selectively terminating or switching off the electric circuit between said second conductor terminal and said conductor coupling member when overheated or overloaded, and a reset knob slidably engaged through said aperture of said housing and including an inner portion having an actuator for selectively switching on the electric circuit between said second conductor terminal and said conductor coupling member after said conductor blade of said circuit breaker has switched off the electric circuit between said second conductor terminal and said conductor coupling member.

2. The electric coupling device as claimed in claim 1, wherein said conductor coupling member includes a first electrical contact member disposed on said bent segment, and said conductor blade includes a second electrical contact member disposed on said second end of said conductor blade for selectively contacting with said first electrical contact member of said conductor coupling member.

3. The electric coupling device as claimed in claim 1, wherein said conductor coupling member includes a first end having a hole for receiving said free end of said second prong.

4. The electric coupling device as claimed in claim 1, wherein a carrier is slidably engageable into said chamber of said housing for supporting said second conductor terminal and said conductor coupling member.

5. The electric coupling device as claimed in claim 4, wherein said carrier includes a recess for receiving and seating said second conductor terminal.

6. The electric coupling device as claimed in claim 4, wherein said carrier includes a recess for receiving and seating said bent segment of said conductor coupling member.

7. The electric coupling device as claimed in claim 4, wherein said housing includes an orifice formed in one of said side walls and communicating with said chamber of said housing, and said carrier includes at least one hole aligned with said orifice of said side wall of said housing, and a lock pin engaged through said orifice of said housing and said at least one hole of said carrier for securing said carrier to said housing.

8. The electric coupling device as claimed in claim 4, wherein said carrier includes a bulge, and a cap includes a depression for receiving said bulge of said carrier and for anchoring said cap between said carrier and said rear wall of said housing.

9. The electric coupling device as claimed in claim 8, wherein said carrier includes at least one peg extended from said bulge for engaging with said cap and for securing said cap to said carrier.

10. The electric coupling device as claimed in claim 4, wherein said housing includes at least one rail extended from said side walls and extended into said chamber of said housing for engaging with said carrier and for securing said carrier to said housing.

11. The electric coupling device as claimed in claim 1, wherein a ground prong is disposed in said socket opening of said housing and disposed above said first and said second prongs, and a ground terminal is disposed extended out of said housing and electrically coupled to said ground prong.

* * * * *